United States Patent [19]
Walley

[11] Patent Number: 4,491,372
[45] Date of Patent: Jan. 1, 1985

[54] PENALTY BRAKE APPLICATION NULLIFICATION-PREVENTION SYSTEM

[75] Inventor: Esmet Walley, McKeesport, Pa.

[73] Assignee: American Standard Inc., Wilmerding, Pa.

[21] Appl. No.: 483,972

[22] Filed: Apr. 11, 1983

[51] Int. Cl.³ .......................... B60T 7/16; B60T 7/18
[52] U.S. Cl. ................................................ 303/18; 303/86
[58] Field of Search .............. 303/8, 2, 3, 1, 18, 303/19, 91, 92, 33-38, 81, 82, 86, 55, 13-15; 188/151 A, 109

[56] References Cited

U.S. PATENT DOCUMENTS 2,860,928 11/1958 Gorman ............................ 303/18
2,958,561 11/1960 May .................................. 303/8

Primary Examiner—Douglas C. Butler
Attorney, Agent, or Firm—G. J. Falce

[57] ABSTRACT

A penalty brake application nullification-prevention system for a railroad train in which a bypass circuit is arranged in one embodiment to vent control pressure from the brake pipe cut-off valve of the locomotive brake valve, in order to prevent the engineman form improperly cutting out the brake valve to nullify a penalty brake application, by operating the brake valve cut-out selector valve. In this arrangement, the bypass circuit operates in response to operation of the penalty application valve when an unsafe operating condition of the train arises. In another embodiment, the bypass circuit is arranged to vent brake pipe pressure in parallel with the brake valve, so that, in the event the brake valve cut-out selector valve is improperly operated to nullify a penalty brake application, the penalty application will be initiated by a brake pipe reduction via the bypass circuit.

10 Claims, 2 Drawing Figures

PENALTY BRAKE APPLICATION NULLIFICATION-PREVENTION SYSTEM

Material essential to the understanding of the present invention is incorporated herein by reference to U.S. Pat. No. 2,958,561, which is assigned to the assignee of the present invention.

BACKGROUND OF THE INVENTION

The present invention relates to railway locomotive brake control apparatus and particularly to such apparatus as provides a penalty brake application in the event the locomotive engineer to the train is operating in an unsafe condition. For example, conventional 26 type locomotive brake equipment includes a penalty application valve, which operates in a manner fully explained in columns 14 and 15 of the foregoing reference patent, to initiate a brake application in the event the locomotive engineer fails to periodically give an indication of his alertness, or the locomotive traction motors are operating at an excessive speed, or the train speed is exceeding a safe limit. Should one of these conditions arise, a warning whistle is sounded for a predetermined period of time, indicating an impending automatic penalty brake application. In the event the engineer fails to acknowledge the warning whistle by taking corrective action, a penalty brake application will become effective by reason of the penalty application valve's effecting a reduction of equalizing reservoir pressure.

The engineer's automatic brake valve device, employed in the 26 type locomotive brake equipment, is arranged to respond to a reduction of equalizing reservoir pressure, as explained in columns 2, 3, 4, and 5 of the foregoing reference patent, to initiate a corresponding reduction of the train brake pipe pressure, thereby causing the train brakes to apply.

In addition to a relay valve for providing the brake pipe pressure reduction in accordance with the effective equalizing reservoir pressure, there is further provided a manual selector valve and a brake pipe cut-off valve, the latter of which can be conditioned to cut off the flow of brake pipe fluid pressure to and from the engineer's brake valve by manually setting the selector valve in the cut-out position. This permits the engineer's brake valve device to be deactivated or cut out, by isolating it from the brake pipe, for the purpose of conducting brake pipe leakage tests, to permit multiple-unit operation, to haul a dead locomotive, to permit double-heading operation, etc., as set forth in columns 17 and 18 of the foregoing reference patent.

A dangerous and unauthorized operating procedure is being employed surreptitiously by train engineers, wherein the selector valve on the active brake valve is positioned to cause the brake pipe cut-off valve to interrupt the venting of brake pipe pressure when the operator, or train, is operating in an unsafe condition, in order to prevent the brake valve from venting brake pipe pressure in response to a reduction of equalizing reservoir pressure by the penalty application valve. In this way, the engineer is able to nullify the penalty brake application in an unauthorized and improper manner, i.e., without any brake application whatsoever being made.

SUMMARY OF THE INVENTION

The object of the present invention is to provide an automatic penalty brake application when the penalty application valve is actuated, even in the event the engineer's brake valve device is cut out by improper and devious operation of the selector valve.

This objective is achieved by sensing actuation of the penalty application valve and by using this signal to pilot a two-position, normally-closed exhaust valve. In one embodiment of the invention, the exhaust valve is connected to the brake pipe to effect a brake pipe reduction in bypass of the cut-out brake valve, when the penalty application valve is actuated, and the selector valve is set in the cut-out position. A second normally-open exhaust valve in the pilot line connects the pilot pressure to the first exhaust valve only when the second valve is piloted by a pressure signal produced by movement of the selector valve to cut-out position.

In another embodiment of the invention, the first exhaust valve is connected to the brake pipe cut-off valve control chamber to vent the pressure signal produced when the selector valve is moved to cut-out position, thereby preventing the cut-off valve from being actuated to a closed position, when the penalty application valve is actuated.

BRIEF DESCRIPTION OF THE DRAWINGS

These and other objects and advantages of the invention will become apparent from the following more detailed explanation when taken with the accompanying drawings wherein:

FIG. 1 is a schematic showing a first embodiment of the invention in which a bypass circuit employs a pair of two-position pneumatic valves for venting brake pipe pressure in the event the engineer's brake valve is cut out at the time a penalty brake application is called for.

FIG. 2 is a schematic showing a second embodiment in which a single, two-position pneumatic valve is employed to vent the brake pipe cut-off valve control chamber at the engineer's brake valve when a penalty brake application is called for.

DESCRIPTION AND OPERATION

Figure 1:
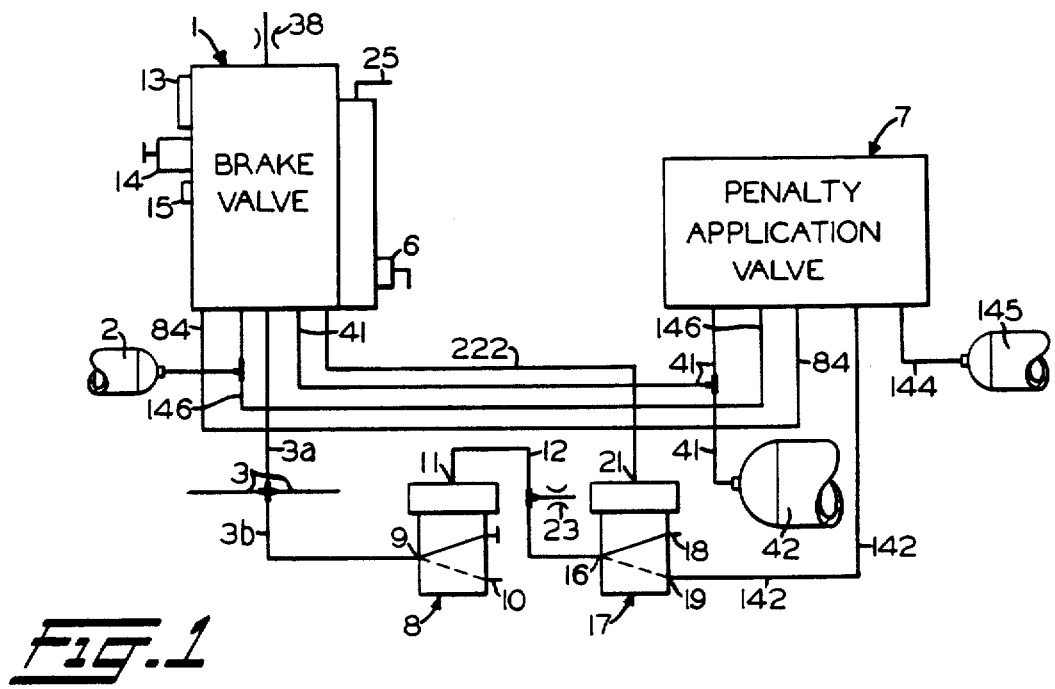
Figure 2:
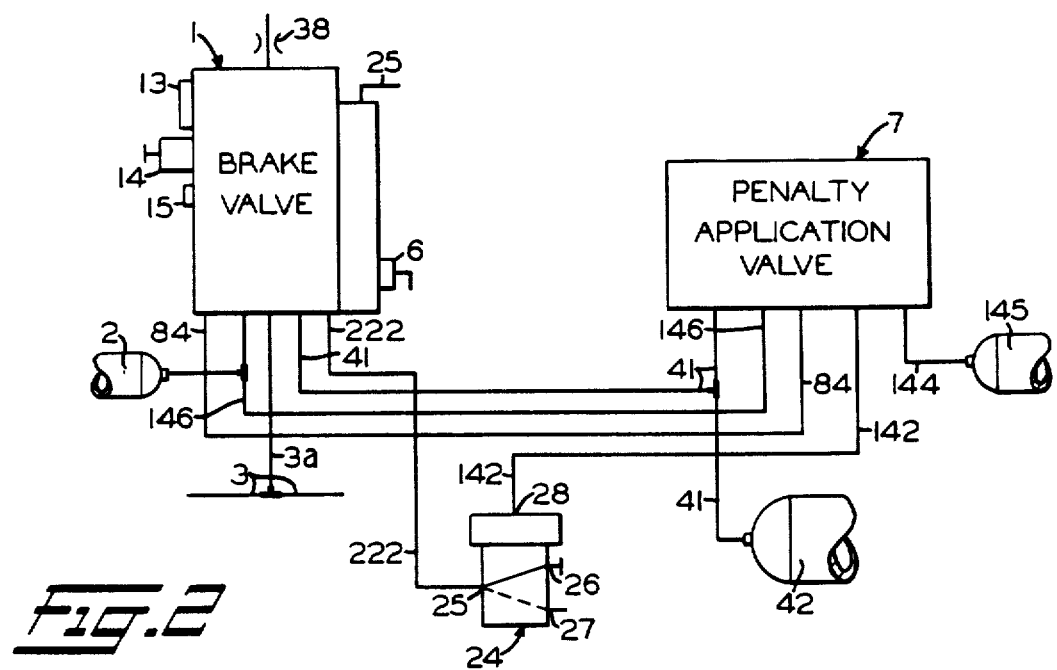

In order to simplify the explanation of the present invention, as represented in the embodiments of FIGS. 1 and 2, the valve devices and connected piping, corresponding to identical parts in the incorporating reference patent, are provided with like reference numerals.

A conventional engineer's brake valve device 1 includes a selector valve 6, a relay valve 13, a regulating valve 14, and a brake pipe cut-off valve 15, all of which operate in the usual, well-known manner, as briefly explained hereinafter. A main reservoir 42 is maintained charged by the locomotive air compressor (not shown). Compressed air is connected from main reservoir 42 via a pipe 41 leading to brake valve device 1, where this pressure is adjusted to the desired setting by regulating valve 14, in accordance with the position of the brake valve handle 25. Air at this adjusted pressure is, in turn, connected to a pipe 84 leading from brake valve device 1 to a penalty application valve device 7. A spool valve (not shown) normally connects this air from application valve 7 to a pipe 146 leading to an equalizing reservoir 2, and thence to the brake valve relay valve 13. Also connected to relay valve 13 via a branch pipe 3a is the air carried in brake pipe 3. Relay valve 13 is operative in response to the equalizing reservoir/brake pipe pressure differential to either supply pressure to the brake pipe 3 from main reservoir 42, or to exhaust pressure from brake pipe 3 to atmosphere via an exhaust choke 38, depending upon whether the equalizing reservoir pressure is greater or less than the effective brake pipe pressure.

Selector valve 6 may be manually set to a cut-in or a cut-out position. In cut-out position, the selector valve connects main reservoir pressure from pipe 41 to the control chamber of the brake pipe cut-off valve 15, which is accordingly operated to its closed position to interrupt the flow of air between brake pipe 3 and relay valve 13. Consequently, brake valve device 1 is incapable of varying brake pipe pressure in either a positive or negative direction, and the brake valve device is said to be "cut-out" of service.

In cut-in position of the selector valve, the control chamber of the brake pipe cut-off valve is vented to atmosphere, thus permitting the cut-off valve to assume its normal open position in which air flow is established between brake pipe 3 and relay valve 13. Consequently, brake valve device 1 is capable of varying brake pipe pressure in accordance with the selective position of handle 25, and the brake valve is said to be "cut in".

Penalty application valve device 7 operates to initiate a penalty brake application whenever an unsafe operation condition exists, such as, failure of the operator to periodically acknowledge his alertness, or when an overspeed condition of the train or traction motors is detected. When one of the foregoing unsafe operating conditions is detected, penalty application valve device 7 connects equalizing reservoir pressure to a reduction limiting reservoir 145 via pipes 146 and 144, whereby the equalizing reservoir pressure, and, consequently, the train brake pipe pressure is reduced to initiate the penalty brake application.

In accordance with the present invention, as shown in FIG. 1 of the drawings, there is further provided a two-position, two-way pneumatic valve 8 having an inlet 9 to which a branch pipe 3b of brake pipe 3 is connected, and an atmospheric outlet 10. A control port 11 of pneumatic valve 8 is connected by a pipe 12 to delivery port 16 of a two-position, three-way pneumatic valve 17. An exhaust port 18 of valve 17 is connected to atmosphere, while an inlet 19 is connected via a pipe 142 to penalty application valve 7. A control port 21 of valve 17 is connected to brake valve device 1 via a pipe 222. A choked atmospheric bleed orifice 23 is provided in pipe 12.

When an unsafe situation exists, penalty application valve 7 is actuated, as fully explained in the incorporating reference patent, in order to effect a penalty brake application. Equalizing reservoir pressure is reduced by reason of being connected via the actuated penalty application valve to reduction limiting reservoir 145, while main reservoir pressure is concurrently connected to pipe 142.

Under proper operating conditions, selector valve 6 is in cut-in position and pipe 222, leading to control port 21 of pneumatic valve 17, is vented to atmosphere at the selector valve, thereby establishing the normal position of the brake pipe cut-off valve 15 and of pneumatic valve 17. Delivery port 16 of pneumatic valve 17 is thus cut off from inlet port 19 and is connected to atmosphere at exhaust port 18. Pressure in pipe 142 is accordingly cut off from control port 11 of pneumatic valve 8, which also assumes its normal position in which inlet port 9 is blanked thereby preventing the exhaust of brake pipe pressure via pipe 3b.

Since brake pipe cut-off valve 15 of brake valve device 1 is open, however, operation of relay valve 13 in response to the aforementioned reduction of equalizing reservoir pressure via penalty application valve 7 is effective to provide a corresponding reduction of brake pipe pressure and thereby cause a penalty brake application in a conventional manner, as a result of the unsafe operating condition.

In the event the operator attempts to improperly suppress an impending penalty brake application by turning selector valve 6 to a cut-out position, as previously discussed, in which the brake pipe cut-off valve 15 is improperly closed, pipe 222 is concurrently pressurized. Pneumatic valve 17 is thus shifted to its other position, connecting the previously-mentioned pressure in pipe 142 to orifice 23, whereby control port 11 of pneumatic valve 8 is pressurized to shift valve 8 to its other position. Brake pipe pressure is thus vented to atmosphere via branch pipe 3b, inlet 9, and outlet 10 of pneumatic valve 8, thereby effecting a reduction of brake pipe pressure in bypass of the improperly closed brake pipe cut-off valve 15, to assure that a penalty brake application will occur, notwithstanding the operator's attempt to circumvent such penalty application.

In exhausting brake pipe pressure at pneumatic valve 8 in bypass of the improperly cut-out brake valve device 1, when a penalty brake application is called for, it will be noted that either a service or an emergency rate of brake pipe pressure reduction can be provided for, depending upon the size of the exhaust orifice provided at outlet 10. Thus, either a service or an emergency penalty brake application can be obtained, as desired.

Release of a penalty brake application, produced by the apparatus of the present invention, is provided for by moving handle 25 of brake valve device 1 to suppression position, which causes penalty application valve 7 to reset to its deactuated condition in the usual, well-known manner. In its deactuated condition, penalty application valve 7 connects pipe 142 to atmosphere to exhaust the pressure at control port 11 of pneumatic valve 8, which accordingly resets and terminates the exhaust of brake pipe 3 via branch pipe 3b. This conditions brake pipe 3 to be recharged upon subsequent movement of brake valve handle 25 to release position, provided selector valve 6 has been reset to cut-in position, thereby effecting a release of the penalty brake application.

When it is desired to change control stations, the brake valve handle 25 is placed in handle-off position, which suppresses actuation of penalty application valve 7 in the usual, well-known manner. This permits selector valve 6 to be properly placed in cut-out position without jeopardy of a penalty brake application resulting, even though pneumatic valve 17 is actuated by pressurization of pipe 222 in cut-out position of selector valve 6, since pipe 142 is vented to atmosphere. This assures that pipe 12 and control port 11 of pneumatic valve 8 are also vented to prevent actuation of pneumatic valve 8. Consequently, no brake pipe pressure can exhaust at pneumatic valve 8 when brake valve 1 is in handle-off position and selector valve 6 is in cut-out position at the inoperative control station.

The purpose of bleed orifice 23 is to prevent any unintentional build-up of pressure at control port 11, in the event main reservoir pressure should leak past the penalty application valve spool (not shown), as such leakage over a period of time could otherwise build up sufficiently to actuate pneumatic valve 8, and cause an undesirable brake application. The capacity of bleed orifice 23 is such as to dissipate leakage pressure during deactuation of penalty application valve 7, without preventing a pressure build-up at control port 11 of pneumatic valve 8 when pipe 142 is pressurized during actuation of penalty application valve 7.

In the embodiment of FIG. 2, only a single, two-position, two-way pneumatic valve 24 is employed with the conventional brake valve device 1 and penalty application valve 7. Pneumatic valve 24 includes an inlet 25 connected to pipe 222, a plugged outlet 26, an atmospheric outlet 27, and a control port 28 connected to pipe 142.

Under normal operating conditions, penalty application valve 7 is deactuated and pipe 142 is accordingly depressurized. Therefore, pneumatic valve 24 is in its normal position in which inlet 25 is connected to the plugged outlet 26. In the cut-in position of selector valve 6, pipe 222, which is connected to inlet 25, is vented and, accordingly, the brake pipe cut-off valve 15 is open to permit brake valve control of brake pipe pressure.

In the event an unsafe operating condition arises, penalty application valve 7 becomes actuated, whereby pipe 142 is pressurized concurrently with the connection of equalizing reservoir pressure to the reduction limiting reservoir 145. Control port 28 is thus pressurized to actuate pneumatic valve 24 to a position in which inlet 25 is connected to atmosphere at outlet 27. Pipe 222, which is connected to the control chamber of the brake pipe cut-off valve 15, is thus vented to atmosphere. Therefore, in the event the operator attempts to improperly suppress the impending penalty brake application, by operating selector valve 6 to its cut-out position, in which main reservoir pressure is connected to the control chamber of brake pipe cut-off valve 15, insufficient pressure to actuate the cut-off valve 15 will develop. Brake valve relay valve 13 will thus respond to the equalizing reservoir pressure reduction effected by the penalty application valve 7 to, in turn, effect a reduction of brake pipe pressure via the open brake pipe cut-off valve 15. In this manner, the operator is prevented from "cutting out" the brake valve device 1. A penalty brake application is thus assured in response to the reduction of brake pipe pressure via the open brake pipe cut-off valve 15.

Release of the penalty brake application is obtained by moving the brake valve handle 25 to suppression position, and, subsequently, returning handle 25 to release position. In accordance with conventional, well-known operation, penalty application valve 7 is reset by movement of the brake valve handle to suppression position. In this reset position, reduction limiting reservoir 145 is cut off from equalizing reservoir 2 and is, in turn, connected to atmosphere preparatory to initiating a subsequent penalty brake application. Concurrently, pipe 142 is vented to reset pneumatic valve 24. Also, pipes 84 and 146 are reconnected to establish equalizing reservoir charging upon subsequent movement of brake valve handle 25 to release position, in response to which relay valve 13 is operative to recharge brake pipe pressure, provided selector valve 6 has been reset to cut-in position, thereby effecting a release of the penalty brake application.

When it is desired to change control stations, handle 25 is moved to handle-off position, which suppresses actuation of penalty application valve 7 from its reset position in the usual, well-known manner. Pipe 142 thus remains vented to depressurize control port 28 of pneumatic valve 24, which assumes the position shown, in which pipe 222 is cut off from atmosphere at outlet 27.

Consequently, the control chamber of brake pipe cut-off valve 15, to which pipe 222 is connected, is pressurized by connection with main reservoir 42 via pipe 41, when selector valve 6 is placed in cut-out position, to thereby close the brake cut-off valve 15, and, accordingly, "cut out" brake valve device 1.

Having now described the invention, what I claim as new and desire to secure by Letters Patent, is:

1. A penalty brake application nullification-prevention system for a railroad train comprising:
   (a) a brake pipe in which fluid under pressure is carried, a reduction of said brake pipe fluid pressure being effective to apply the train brakes;
   (b) a brake valve device to which said brake pipe is connected comprising:
      1. relay valve means for effecting said reduction of said brake pipe fluid pressure;
      2. a manually positionable selector valve having a cut-in and a cut-out position; and
      3. cut-off valve means between said brake pipe and relay valve means and operable to a closed position for interrupting fluid pressure communication between said brake pipe and said relay valve means in said cut-out position of said selector valve;
   (c) penalty application valve means for sensing an unsafe operating condition of said train to thereby cause said relay valve means to effect said reduction of said brake pipe fluid under pressure; and
   (d) means operative in response to said penalty application valve sensing an unsafe operating condition of said train and to said selector valve being set in said cut-out position for exhausting said brake pipe fluid under pressure in bypass of said cut-off valve means.

2. A penalty brake application nullification-prevention system, as recited in claim 1, wherein said means for exhausting said brake pipe fluid under pressure in bypass of said cut-off valve means comprises:
   (a) a first pneumatic control valve device having an inlet port connected to said brake pipe, an outlet port connected to atmosphere, and a control port; and
   (b) a second pneumatic control valve device having a delivery port connected to said control port of said first control valve, an exhaust port connected to atmosphere, an inlet port connected to said penalty application valve means, and a control port connected to said selector valve.

3. A penalty brake application nullification-prevention system, as recited in claim 2, further characterized by:
   (a) said selector valve, in said cut-in position, venting said control port of said second control valve to establish a first position thereof in which said delivery port is connected to said exhaust port and, in said cut-out position, pressurizing said control port of said second control valve to establish a second position thereof in which said inlet port thereof is connected to said delivery port;
   (b) said penalty application valve means connecting fluid under pressure to said second outlet when said unsafe operating condition is sensed to effect pressurization of said control port of said first control valve; and
   (c) said first control valve being actuated in response to pressurization of said control port thereof to connect said inlet port thereof to said outlet port, said first control valve being deactuated in response to depressurization of said control port thereof to interrupt said connection between said inlet port thereof and said outlet port.

4. A penalty brake application nullification-prevention system, as recited in claim 3, further comprising:
   (a) a main reservoir in which fluid under pressure is stored;
   (b) said main reservoir being connected to said penalty application valve means to provide a source of fluid under pressure to pressurize said inlet of said second control valve when said penalty application valve senses said unsafe operating condition; and
   (c) said main reservoir being connected to said selector valve for providing a source of fluid under pressure to pressurize said control port of said second control valve and to concurrently operate said cut-off valve means to said closed position, when said selector valve is set in said cut-out position.

5. A penalty brake application nullification-prevention system, as recited in claim 2, further comprising bleed means for exhausting fluid under pressure from said control port of said first control valve at a controlled rate.

6. A penalty brake application nullification-prevention system, as recited in claim 5, wherein said controlled rate is less than the rate of flow of fluid under pressure to said control port of said first control valve when said penalty application valve means is operated and said second pneumatic control valve is in said second position.

7. A penalty brake application nullification-prevention system, comprising:
   (a) a brake pipe in which fluid under pressure is carried, a reduction of said brake pipe fluid pressure being effective to apply the train brakes;
   (b) a brake valve device to which said brake pipe is connected comprising:
      1. relay valve means for effecting said reduction of said brake pipe fluid pressure;
      2. a cut-off valve between said brake pipe and relay valve means having a control chamber pressurization which establishes an open position in which fluid pressure communication is provided between said relay valve means and said brake pipe, and depressurization of which establishes a closed position in which said communication is interrupted; and
      3. a manually positionable selector valve having a cut-out position in which fluid under pressure is connected to a control chamber of said cut-off valve to effect actuation thereof to said closed position, and a cut-in position in which said control chamber is exhausted of fluid under pressure to effect operation thereof to said open position;
   (c) penalty application valve means for sensing an unsafe operating condition of said train to cause said relay valve means to effect said reduction of said brake pipe fluid under pressure; and
   (d) means operative in response to said penalty application valve means sensing said unsafe operating condition for exhausting said control chamber of said cut-off valve whenever said selector valve is in said cut-out position.

8. A penalty brake application nullification-prevention system, as recited in claim 7, wherein said means for exhausting said control chamber comprises a pneumatic control valve having a control port connected to said penalty application valve means, an inlet port connected to said control chamber of said cut-off valve, and an outlet port connected to atmosphere.

9. A penalty brake application nullification-prevention system, as recited in claim 8, further comprising a main reservoir in which fluid under pressure is stored, said main reservoir being connected to said penalty application valve means to provide a source of fluid under pressure to pressurize said control port when said penalty application valve senses said unsafe operating condition, whereby said control valve is shifted from a first position in which said inlet port is cut off from said outlet port, to a second position in which said inlet port is connected to said outlet port.

10. A penalty brake application nullification-prevention system, as recited in claim 9, wherein said main reservoir is connected to said selector valve, said selector valve in said cut-out position connecting said main reservoir fluid under pressure to said control chamber of said cut-off valve.

* * * * *